United States Patent
Garcia et al.

(10) Patent No.: US 10,871,574 B2
(45) Date of Patent: Dec. 22, 2020

(54) KINEMATICS-AUGMENTED POSITION VALIDATION

(71) Applicant: Aireon LLC, McLean, VA (US)

(72) Inventors: Michael A. Garcia, Ashburn, VA (US); John Dolan, Chantilly, VA (US)

(73) Assignee: AIREON LLC, McLean, VA (US)

( * ) Notice: Subject to any disclaimer, the term of this patent is extended or adjusted under 35 U.S.C. 154(b) by 179 days.

(21) Appl. No.: 16/135,558

(22) Filed: Sep. 19, 2018

(65) Prior Publication Data

US 2020/0088887 A1     Mar. 19, 2020

(51) Int. Cl.
*G01S 19/23*        (2010.01)
*G01S 19/02*        (2010.01)

(52) U.S. Cl.
CPC .............. *G01S 19/23* (2013.01); *G01S 19/02* (2013.01)

(58) Field of Classification Search
CPC .. G01S 19/23; G01S 19/19235; G01S 19/258; G01S 19/256; G01S 19/29; G01S 19/02
USPC .................................................... 342/357.62
See application file for complete search history.

(56) References Cited

U.S. PATENT DOCUMENTS

| | | |
|---|---|---|
| 2014/0002293 A1 | 1/2014 | Behrens et al. |
| 2018/0196140 A1 | 7/2018 | Garcia et al. |
| 2019/0226870 A1* | 7/2019 | Ahlbrecht ............ G08G 5/0013 |

OTHER PUBLICATIONS

European Patent Office, Extended Search Report issued in counterpart European Patent Application No. 19198295.8, dated Feb. 13, 2020.
Rich Castaldo, "Atlanta Hartsfield International Airport Results of FAA Trial to Accurately Locate/Identify Aircraft on the Airport Movement Area," Position Location and Navigation Symposium, Apr. 22-26, 1996 (IEEE 1996), pp. 373-380.
Australian Government—IP Australia, Examination Report issued in Australian Patent Application No. AU 2019229382, dated May 25, 2020.
European Patent Office, Office Action issued in European Patent Application No. EP 19 198 295.8, dated Oct. 27, 2020.

\* cited by examiner

*Primary Examiner* — Harry K Liu
(74) *Attorney, Agent, or Firm* — Baker Botts L.L.P.

(57) ABSTRACT

In one implementation, a method includes receiving a number of instances of a message that includes a self-reported position of a transmitter of the message from a corresponding number of satellite-based receivers that each received an RF transmission of an instance of the message. The method also includes determining the number of satellite-based receivers that received an instance of the message and selecting a validation technique based on the number of satellite-based receivers that received an instance of the message. If the number of satellite-based receivers that received an instance of the message is one, a propagation-based validation technique is selected. The method further includes determining a measure of the likelihood that the self-reported position of the transmitter is valid using the selected validation technique, and transmitting an indication of the measure of the likelihood that the self-reported position is valid.

21 Claims, 12 Drawing Sheets

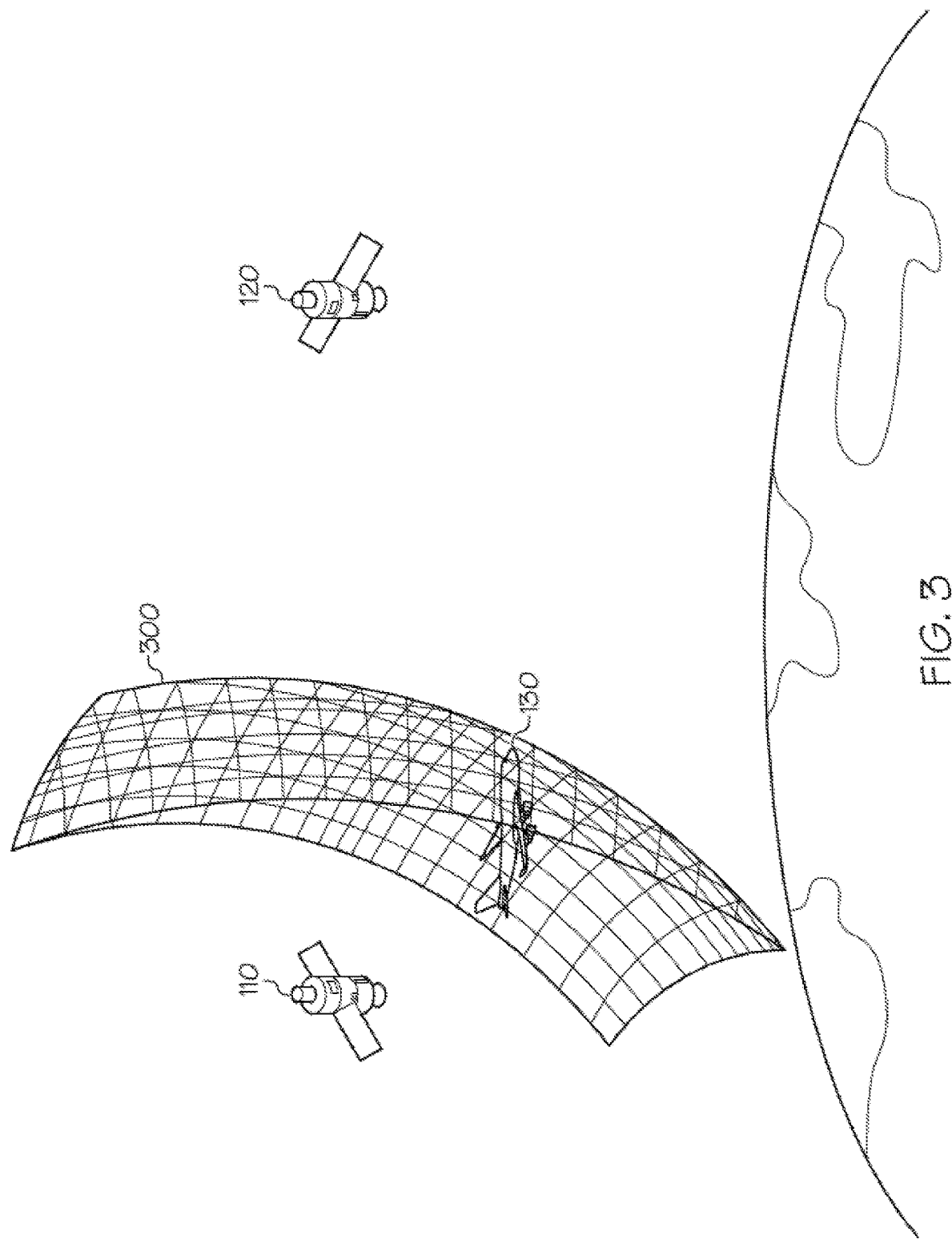

| PARAMETER | EXAMPLE SCORE WEIGHT | EXAMPLE TIME TO LIVE (s) |
|---|---|---|
| TDOA VALIDATION | 5 | 600 |
| BEAM VALIDATION | 1 | 2 |

FIG. 4A $$\text{Total\_Validation\_Percentage} = \frac{\sum_{i=1}^{N} v_i \cdot \omega_i}{\sum_{i=1}^{N} \omega_i}$$

* Where N is the number of scores with an active validity time, v is the validation state for score i (either 1 for valid or 0 for invalid), and ω is the weight of score i (based on the table above)

FIG. 4B

1: Find Record for Target
2: if Last Reported Position was TDOA Validated then
3: $\Phi_1 \leftarrow$ Last TDOA Validated Reported Latitude
4: $L_1 \leftarrow$ Last TDOA Validated Reported Longitude
5: else
6: $\Phi_1 \leftarrow$ Last Propagated Latitude
7: $L_1 \leftarrow$ Last Propagated Longitude
8: end if
9: $\alpha_1 \leftarrow$ Last Reported Heading
10: $V \leftarrow$ Last Reported Speed
11: $T_1 \leftarrow$ Last Reported TOMR
12: $T_2 \leftarrow$ Current Reported TOMR   ▷ This will include the "Last" values indicated below
13: $s = V(T_2 - T_1)$
14: $\Phi_2, L_2 \leftarrow$ Vincenty'sFormula($\Phi_1, L_1, \alpha_1, s$)
15: return $\Phi_2, L_2$

FIG. 8

1: $U_1 = \arctan((1-f)\tan\Phi_1)$
2: $\sigma_1 = \arctan(\tan U_1/\cos\alpha_1)$
3: $\sin\alpha = \cos U_1 \sin\alpha_1$
4: $\cos^2\alpha = 1 - \sin^2\alpha$
5: $u^2 = \cos^2\alpha(a^2 - b^2)/b^2$
6: $A = 1 + \frac{u^2}{16384}(4096 + u^2(-768 + u^2(320 - 175u^2)))$
7: $B = \frac{u^2}{1024}(256 + u^2(-128 + u^2(74 - 47u^2)))$
8: $\sigma = s/(bA)$
9: while Change in $\sigma > \epsilon$ do   ▷ $\epsilon$ can be very small, on the order of 1E-12, as this loop converges very quickly
10:   $2\sigma_m = 2\sigma_1 + \sigma$
11:   $\Delta\sigma = B\sin\sigma(\cos(2\sigma_m) + \frac{1}{4}B(\cos\sigma(-1 + 2\cos^2(2\sigma_m)) - \frac{B}{6}\cos(2\sigma_m)(-3 + 4\sin^2\sigma)(-3 + 4\cos^2(2\sigma_m))))$
12:   $\sigma = s/(bA) + \Delta\sigma$
13: end while
14: $\Phi_2 = \arctan\left(\frac{\sin U_1 \cos\sigma + \cos U_1 \sin\sigma \cos\alpha_1}{(1-f)\sqrt{\sin^2\alpha + (\sin U_1 \sin\sigma - \cos U_1 \cos\sigma \cos\alpha_1)^2}}\right)$
15: $\lambda = \arctan\left(\frac{\sin\sigma \sin\alpha_1}{\cos U_1 \cos\sigma - \sin U_1 \sin\sigma \cos\alpha_1}\right)$
16: $C = \frac{f}{16}\cos^2\alpha(4 + f(4 - 3\cos^2\alpha))$
17: $L = \lambda - (1-C)f\sin\alpha(\sigma + C\sin\sigma(\cos(2\sigma_m) + C\cos\sigma(-1 + 2\cos^2(2\sigma_m))))$
18: $L_2 = L + L_1$
19: $\alpha_2 = \arctan\left(\frac{\sin\alpha}{-\sin U_1 \sin\sigma + \cos U_1 \cos\sigma \cos\alpha_1}\right)$
20: return $\Phi_2, L_2, \alpha_2$

FIG. 9

```
1: Start with a target report
2: for each satellite detecting the target do
3:     R ← Calculate slant range from target to satellite[i]        ▷ i represents each satellite index
4:     if R > MaxRange then
5:         Add "Bad Range" score to "Invalid" Score
6:     end if
7: end for
8: if More than one satellite then
9:     D ← TDOA Validation
10:    if D ≤ r_A then
11:        Add "Good TDOA" score to "Valid A" Score
12:    else if D ≤ r_B then
13:        Add "Good TDOA" score to "Valid B" Score
14:    else
15:        Add "Bad TDOA" score to "Invalid" Score
16:    end if
17: end if
18: T_TDOA ← Time of last TDOA solution
19: T_msg ← Received message TOMR
20: if T_TDOA + Coast_Min < T_msg < T_TDOA + Coast_Max then
21:    Lat_prop, Lon_prop ← Target Propagation
22:    D ← Distance between Reported Lat/Lon and Propagated Lat/Lon
23:    if D ≤ r_A & TDOA_Prev =Valid A then        ▷ The previous TDOA validation met the "Valid A" distance
24:        Add "Good Track" score to "Valid A" Score
25:    else if D ≤ r_B then
26:        Add "Good Track" score to "Valid B" Score
27:    else
28:        Add "Bad Track" score to "Invalid" Score
29:    end if
30: end if
31: Update Aircraft Record with Valid A, Valid B, Invalid Scores
```

FIG. 11

1: Delete all scores older than TTL
2: $\Sigma_{Inv}$ = sum of all "Invalid" scores
3: $\Sigma_A$ = sum of all "Valid A" scores
4: $\Sigma_B$ = sum of all "Valid B" scores
5: $\Sigma_{Valid} = \Sigma_A + \Sigma_B$
6: $\Sigma_{All} = \Sigma_{Valid} + \Sigma_{Inv}$
7: if $\Sigma_{All} >$ Minimum Score then
8:     if $\Sigma_{Inv}/\Sigma_{All} >$ Invalid Threshold then
9:         Set Target Validation State to *Invalid*
10:     end if
11:     if $\Sigma_A/\Sigma_{Valid} >$ Valid A Threshold then
12:         Set Target Validation State to *Valid A*
13:     else
14:         Set Target Validation State to *Valid B*
15:     end if
16: else
17:     Set Target Validation State to *Unknown*
18: end if

FIG. 12

KINEMATICS-AUGMENTED POSITION VALIDATION

TECHNICAL FIELD

The disclosure relates generally to kinematics-augmented position validation.

SUMMARY

According to one implementation of the disclosure, a method includes receiving a number of instances of a message that includes a self-reported position of a transmitter of the message from a corresponding number of satellite-based receivers that each received an RF transmission of an instance of the message. The method also includes determining the number of satellite-based receivers that received an instance of the message and selecting a validation technique based on the number of satellite-based receivers that received an instance of the message. If the number of satellite-based receivers that received an instance of the message is one, a propagation-based validation technique is selected. The method further includes determining a measure of the likelihood that the self-reported position of the transmitter is valid using the selected validation technique and transmitting an indication of the measure of the likelihood that the self-reported position is valid.

Other features of the present disclosure will be apparent in view of the following detailed description of the disclosure and the accompanying drawings. Implementations described herein, including the above-described implementation, may include a method or process, a system, or computer-readable program code embodied on computer-readable media

BRIEF DESCRIPTION OF THE DRAWINGS

For a more complete understanding of the present disclosure, reference now is made to the following description taken in connection with the accompanying drawings.

FIG. 3 illustrates an example of a hyperboloid defining potential locations of a transmitter derived by a time difference of arrival technique in accordance with a non-limiting implementation of the present disclosure.

FIG. 4A is a table showing examples of configurable parameters for use in validating self-reported position data in accordance with a non-limiting implementation of the present disclosure.

FIG. 4B shows an example of an equation for calculating a total validation percentage score in accordance with a non-limiting implementation of the present disclosure.

FIGS. 8 and 9 collectively illustrate an example of a process for projecting a target's position based on previous position information for the target.

FIGS. 11 and 12 collectively illustrate one example of a historical scoring method for validating self-reported position data.

DETAILED DESCRIPTION

Figure 1:
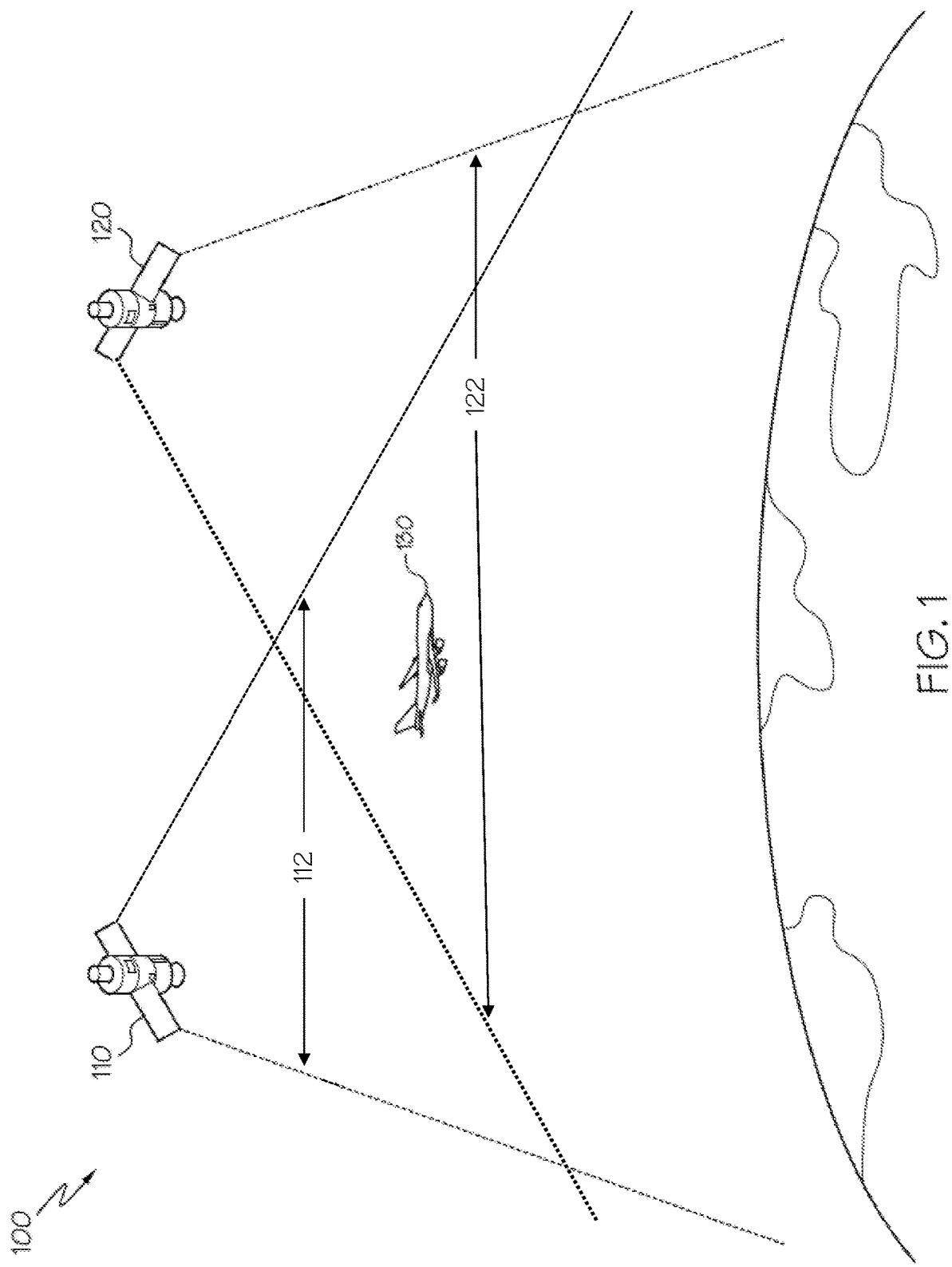
FIG. 1 is a block diagram of a portion of an example of a system for self-reported position validation using space-based receivers in accordance with a non-limiting implementation of the present disclosure.

Historically, aircraft surveillance and flight path management services have utilized ground-based radar stations and other terrestrial surveillance data processing systems. For example, such systems have employed primary surveillance radar (PSR), secondary surveillance radar (SSR), and/or Mode-S radar for communicating flight position and monitoring information to local ground stations, which then may relay received flight position and monitoring information to regional or global aircraft monitoring systems. Recently, automatic dependent surveillance-broadcast ("ADS-B") has gained attention as a potential replacement for conventional radar technology in modern flight surveillance systems. In such systems, an aircraft-borne transmitter may transmit occasional (e.g., periodic) messages that include flight position and other related information, for example, in some implementations, via Extended Squitter messages over 1090 MHz Mode-S (i.e., 1090ES). Such ADS-B messages from the aircraft-borne transmitter then may be received by receiving infrastructure and transmitted to air traffic control or other aircraft surveillance and flight path management systems.

As such, ADS-B aircraft surveillance relies on information that is self-reported by the aircraft themselves to track and manage the aircraft. Such self-reported ADS-B information may include position information such as altitude, latitude, longitude, etc., travel vector data, and other aircraft and/or flight status information. Because ADS-B aircraft surveillance relies on self-reported information, ADS-B aircraft surveillance systems may be susceptible to errors in the self-reported information. For example, ASD-B aircraft surveillance systems may be susceptible to self-reported information that is intentionally false, for instance, when malfeasors spoof ADS-B transmissions by intentionally broadcasting false self-reported information. Additionally or alternatively, ADS-B aircraft surveillance systems may be susceptible to errors caused by malfunctioning avionics on board the aircraft being tracked, for example, when avionics on board the aircraft miscalculate the aircrafts' positions. In order to mitigate negative impacts that may be caused by the presence of errant, self-reported information in ADS-B aircraft surveillance systems, it may be helpful to validate the accuracy of the position information self-reported by the aircraft.

In certain implementations, ground- or satellite-based ADS-B receivers, or systems equipped with or with access to such receivers, can use one or more techniques described in the present disclosure to attempt to validate the accuracy of the position of an aircraft as reported in received ADS-B messages broadcast by the aircraft. For example, in some implementations, two or more ADS-B receivers may have overlapping coverage areas. When an aircraft-borne ADS-B transmitter is located within overlapping portions of the coverage areas of multiple ADS-B receivers, multiple ADS-B receivers may receive ADS-B messages broadcast by the aircraft-borne transmitter. The validity of the reported position of the aircraft then can be evaluated by comparing the self-reported position of the aircraft to an estimated position of the aircraft calculated based, at least in part, on the known positions of the ADS-B receivers and the time difference of arrival of the ADS-B message at each ADS-B receiver. Additionally or alternatively, in some implementations, when an aircraft-borne transmitter is not located within overlapping portions of the coverage areas of multiple ADS-B receivers, the self-reported position information of the aircraft may be validated by comparing the self-reported position of the aircraft to a projected position of the aircraft calculated based, at least in part, on one or more previously self-reported positions of the aircraft and/or one or more previously estimated positions of the aircraft. In some particular implementations, the projected position of the aircraft may be calculated based on previous position information for the aircraft (e.g., either self-reported or estimated) and one or more of a previous velocity of the aircraft, a previous heading of the aircraft, and the period of time that elapsed since the previous position of the aircraft and the time at which the self-reported position of the aircraft under consideration was broadcast by the aircraft.

In some implementations, satellites in a satellite constellation are equipped with ADS-B receivers for receiving ADS-B messages broadcast by aircraft. For example, in some particular implementations, each satellite in a low-Earth orbit (LEO) (e.g., orbits having altitudes of –99-1200 miles) constellation of satellites having 6 planes of 11 satellites in substantially polar orbits may be equipped with an ADS-B receiver such that, collectively, the ADS-B receivers on board the satellites provide global or substantially global ADS-B coverage. In such implementations, the satellites may be connected by inter-satellite crosslinks that effectively create a wireless mesh network in space through which individual satellites of the constellation can communicate with one another and/or with terrestrial infrastructure like earth terminals and the like. As such, ADS-B messages received by the receivers on board the satellites may be communicated through the satellite network to terrestrial communications infrastructure to, for example, an aircraft surveillance system, such as one provided for air traffic control.

Figure 2:
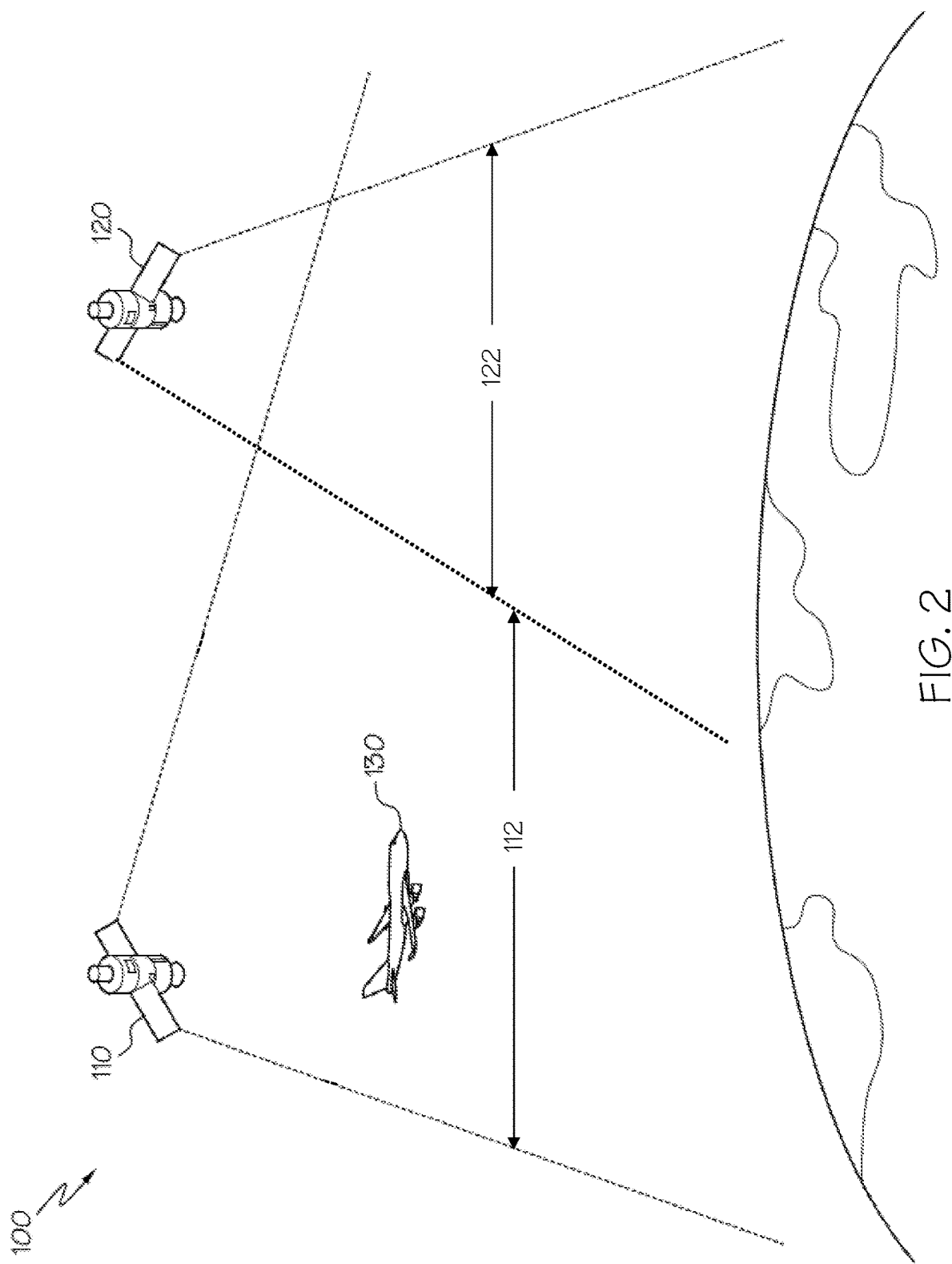
FIG. 2 is a block diagram of a portion of an example of a system for self-reported position validation using space-based receivers in accordance with a non-limiting implementation of the present disclosure.

With reference to FIG. 1, a portion of an example of a system 100 for validating self-reported position information in ADS-B messages using space-based ADS-B receivers is illustrated. In particular, aircraft 130 transmits an ADS-B message (e.g., as a radio-frequency ("RF") signal) using an on-board ADS-B transmitter. Among other information, the ADS-B message may include position, velocity, heading, status, an aircraft and/or flight identifier, and other flight information compiled by the avionics of aircraft 130. A satellite constellation having multiple satellites (e.g., satellites 110 and 120) equipped with ADS-B receivers may be configured such that, in some instances, the coverage areas of individual satellites overlap, while in other instances, the coverage areas do not overlap. For example, as illustrated in FIG. 1, satellite 110 coverage area 112 and satellite 120 coverage area 122 overlap in at least the region where aircraft 130 currently is located. Accordingly, both satellites 110 and 120 may receive the ADS-B message transmitted by aircraft 130. As another example with reference to FIG. 2, aircraft 130 is outside of satellite 120 coverage area 122, and, as illustrated, satellite 110 is the only satellite providing coverage of the region 112 where aircraft 130 currently is located.

When multiple satellite-based receivers receive the same ADS-B message broadcast by an aircraft (e.g., because the coverage areas of the satellite-based receivers overlap and include the aircraft), techniques described in the present disclosure may be used to validate the position information self-reported by the aircraft in the ADS-B message received by the satellite-based receivers. In certain implementations, the current position of aircraft 130 may be estimated based on the time difference of arrival (TDOA) of the ADS-B message at the receivers on satellites 110 and 120. For example, as described in greater detail below, a hyperboloid may be generated based on the TDOA of the ADS-B message at the receivers on satellites 110 and 120 that defines potential positions of aircraft 130. In some cases, a validation distance for the position of the aircraft can be calculated by determining the distance between the position of the aircraft 130 as reported in the ADS-B message and the closest point on the hyperboloid to the self-reported position of the aircraft 130. In such cases, if the validation distance is less than or equal to some defined threshold, the self-reported position of the aircraft 130 included in the ADS-B message may be determined to be valid. Alternatively, if the validation distance is greater than the defined threshold, the self-reported position of the aircraft 130 included in the ADS-B message may be determined to be invalid.

FIG. 3 illustrates one non-limiting example of a hyperboloid 300 defining potential positions of aircraft 130 based on the TDOA of the ADS-B message at the receivers on satellites 110 and 120. That is to say, based on the TDOA of the ADS-B message at the receivers on satellites 110 and 120, the actual position of aircraft 130 is estimated as being at any point along the hyperboloid 300. As illustrated in FIG. 3, hyperboloid 300 is one side of a two-sheeted hyperboloid. In certain implementations, other data can be used to further narrow the estimated potential positions of aircraft 130. For example, in some implementations, the self-reported altitude of the aircraft 130 included in the ADS-B message can be used to define an ellipsoid around the Earth (e.g., intersecting the self-reported altitude of the aircraft 130) such that the intersection of the hyperboloid 300 and the ellipsoid is a curve that defines potential positions of aircraft 130. A validation distance for the position of the aircraft 130 then can be determined by calculating the distance between the position of the aircraft 130 as reported in the ADS-B message and the point on the curve defined by the intersection of the hyperboloid and the ellipsoid.

In some implementations, as time elapses, multiple validation distances for a particular aircraft based on multiple different ADS-B messages transmitted by the aircraft can be calculated (e.g., according to the techniques described herein) and stored for the particular aircraft. In such implementations, this history of stored validation distances (or a portion thereof) preceding the current point in time can be used to validate or invalidate the currently reported position of the aircraft in the current ADS-B message. For example, in certain implementations, a percentage of the validation distances calculated for an aircraft during a defined sliding window in time prior to the current time that are less than or equal to a defined threshold distance is determined. If the percentage is greater than or equal to a defined threshold percentage, the current position of the aircraft as reported in the current ADS-B message may be determined to be valid. Alternatively, if the percentage is less than a defined threshold percentage, the current position of the aircraft as reported in the current ADS-B message may be determined to be invalid.

Additionally or alternatively, in some cases, more than two satellite-based ADS-B receivers may receive the same ADS-B message. According to some implementations, in such cases, the TDOA of the ADS-B message at each unique pair of satellite-based ADS-B receivers that receives the ADS-B message may be used to validate the self-reported position of the aircraft included in the ADS-B message. For example, an estimated position of the aircraft may be determined based on the TDOA of the ADS-B message at each unique pair of ADS-B receivers that receives the message and compared to the self-reported position of the aircraft included in the ADS-B message. In such implementations, the self-reported position of the aircraft may be determined to be valid if some threshold number or percentage of the estimated positions of the aircraft determined based on the TDOA of the ADS-B message at the different unique pairs of ADS-B receivers suggest that the self-reported position of the aircraft is valid. Additionally or alternatively, in implementations in which historical validation data is taken into account in validating the current self-reported position of an aircraft, historical validation data determined by multiple different unique pairs of ADS-B receivers that receive the same ADS-B message during the relevant window in time may be taken into account in validating the current self-reported position of the aircraft.

In some cases, calculating an estimated position of an aircraft based on the TDOA of the same ADS-B message at two or more receivers may be computationally and/or resource intensive. Therefore, in some implementations, instead of calculating an estimated position of an aircraft based on the TDOA of the same ADS-B message at two or more receivers and comparing the estimated position of the aircraft to the position of the aircraft reported in the ADS-B message, TDOA-based validation may be performed by determining the expected TDOA of the ADS-B message at the two or more receivers based on the self-reported position of the aircraft in the ADS-B message (e.g., by accessing a lookup table or other data structure storing expected TDOA data based on the satellite positions and the self-reported aircraft position and/or by calculating the expected TDOA live) and comparing the excepted TDOA to the observed TDOA of the ADS-B message.

A detailed description of one example of an approach for estimating the current position of an aircraft based on the TDOA of an ADS-B message transmitted by the aircraft that is received by two satellites is now provided. While the described approach constructs a hyperboloid based on the TDOA of the ADS-B message at the two satellites and then limits the potential position of the aircraft to the curve defined by the intersection of the hyperboloid and an ellipsoid around the Earth that is defined based on the self-reported altitude of the aircraft, the simpler approach of estimating the current position of the aircraft using only the hyperboloid as described above also will be apparent from the following description.

The general quadratic equation can be represented as:

$$Q(x) = x^T A x + b^T x + c = 0$$

where A is a symmetric N×N matrix, b is an N×1 vector, and c is a scalar. The parameter is x, an N×1 vector. Given a surface or curve defined by $Q(x)=0$ and a point y, the closest point x on the surface must satisfy the condition that $y-x$ is normal to the surface. Since the surface gradient $\Lambda Q(x)$ is normal to the surface, the algebraic condition for the closest point can be represented as:

$$y - x = t \nabla Q(x) = t(2Ax + b)$$

for some scalar t. Therefore:

$$x = (I + 2tA)^{-1}(y - tb)$$

where I is the identity matrix. This equation for x could be substituted into the general quadratic equation to solve for t.

To determine potential estimated positions of an aircraft, a quadratic curve that is the result of the intersection between the above-described TDOA-based hyperboloid and the above-described enlarged Earth ellipsoid may be generated. Both of these quadric surfaces can be defined by the generalized equation:

$$(x-v)^T A (x-v) = 1$$

where A is a matrix whose eigenvectors define the principal directions of the surface and whose eigenvalues are the reciprocals of the squares of the semi-axes: $1/a^2$, $1/b^2$, and $1/c^2$. The parameter vector x contains the coordinates in Earth-centered, Earth fixed (ECEF) coordinates and v represents the offset from center of the Earth. For the hyperboloid, this center is the middle point between the two satellites, and, for the Earth ellipsoid, it is zero.

The matrix A can be constructed if both the eigenvalues and eigenvectors are known using:

$$A = R D R^T$$

where D is a matrix of the eigenvalues oriented along the diagonal and R is a matrix whose columns represent each eigenvector. For a two-sheeted hyperboloid like the TDOA-based hyperboloid, there is one positive eigenvalue and there are two negative eigenvalues. For an ellipsoid, to define the Earth, all of the eigenvalues are positive.

The intersection of the surfaces is where both of their equations are equal. Using the generalized equation for both of these quadratic surfaces and the symbol H to represent the matrix of the TDOA-based hyperboloid and E to represent the matrix of the Earth ellipsoid, yields the following equation:

$$(x-v)^T H (x-v) - x^T E x = 0$$

This equation defines a three-dimensional quadratic curve at the intersection of the hyperboloid and ellipsoid.

For E, an oblate spheroid that matches the WGS-84 definition of the Earth's shape may be defined and then enlarged by the altitude of the target. This may serve to ensure that the intersection is in the tangent plane to the target's actual location. This ellipsoid may be defined by:

$$a = 6378137$$
$$e = 8.1819190842622e - 2$$
$$N = \frac{a}{\sqrt{1 - e^2 \sin^2 \phi}}$$
$$a_e = (N + h)$$
$$b_e = N \cdot (1 - e^2) + h$$

where a is the semi-major axis of the Earth ellipsoid, e is the eccentricity of the Earth ellipsoid, N is the prime vertical radius of curvature, co is the latitude of the target, $a_e$ is the enlarged Earth semi-major axis, and $b_e$ is the enlarged Earth semi-minor axis. These two semi-axes can be used to define the eigenvalues of the enlarged Earth ellipsoid. In the case of the Earth ellipsoid, it already may be oriented in ECEF coordinates such that the eigenvector matrix is the identity matrix which means that E may be defined simply as:

$$E = \begin{bmatrix} \frac{1}{a_e^2} & 0 & 0 \\ 0 & \frac{1}{a_e^2} & 0 \\ 0 & 0 & \frac{1}{a_e^2} \end{bmatrix}$$

For H, the semi-axes may be defined by the relative distance between the two satellites that received the ADS-B message and the TDOA of the ADS-B message at the two satellites. The orientation of the hyperboloid, which provides the eigenvectors and subsequently the matrix R, may be defined by the line between (i) the center point of the two satellites, and (ii) one of the satellites, where this line represents the vertical axis of the hyperboloid. The other two axes may be arbitrary because the hyperboloid is symmetric around the vertical axis. The semi-axes may be calculated as:

$$a_h = \frac{c\Delta t}{2}$$
$$b_h = \sqrt{d^2 - a_h^2}$$

where c is the speed of light, $\Delta t$ is the TDOA of the ADS-B message at the two satellites, and d is the distance between the two satellites. Depending on the implementation, the positions of the satellites and, thus, the distance between the two satellites, may be determined by equipment that determines the instantaneous positions of the satellites in real- or pseudo real-time. Alternatively, in other implementations, the positions of the satellites and the distance between them may be determined based on predetermined orbits of the satellites and/or satellite ephemeris data. Using these semi-axis values and the eigenvectors, the H matrix can be derived:

$$H = R \begin{bmatrix} \frac{1}{a_b^2} & 0 & 0 \\ 0 & -\frac{1}{b_h^2} & 0 \\ 0 & 0 & -\frac{1}{b_h^2} \end{bmatrix} R^T$$

where R is a matrix whose columns are the eigenvectors.

With all of the components of the quadratic curve now defined, the quadratic curve now can be mapped into the generalized form and solved. Recall that the generalized form of the quadratic equation is:

$$Q(x) = x^T A x + b^T x + c = 0$$

Using the equation of the quadratic curve that represents the intersection of the ellipsoid and hyperboloid, each value of the generalized form can be determined:

$$A = H - E$$
$$b = -2v^T H$$
$$c = v^T H v$$

Also recall that the solution for the closest point to a given point on a quadratic curve is provided using the gradient, which gives:

$$x = (I + 2tA)^{-1}(y - tb)$$

Instead of replacing x in the quadratic equation, the problem can be reduced to an easier problem to solve. Because the A matrix is orthonormal, it can be factored using eigen decomposition to obtain $A = RDR^T$. This technique was used earlier to create the matrix defining the hyperboloid. Again, in this case, D is a matrix of the eigenvalues oriented along the diagonal, and R is a matrix whose columns represent each eigenvector. Using this:

$$x = (I + 2tA)^{-1}(y - tb)$$
$$= (RR^T + 2tRDR^T)^{-1}(y - tb)$$
$$= [R(I + 2tD)R^T]^{-1}(y - tb) = R(I + 2tD)^{-1}R^T(y - tb)$$
$$= R(I + 2tD)^{-1}(\alpha - t\beta)$$

where $\alpha = R^T y$ and $\beta = R^T b$. This final equation can be used to replace x in the quadratic equation yielding:

$$0 = [R(I + 2tD)^{-1}(\alpha - t\beta)]^T A [R(I + 2tD)^{-1}(\alpha - t\beta)] +$$
$$b^T [R(I + 2tD)^{-1}(a - t\beta)] + c$$
$$= (\alpha - t\beta)^T (I + 2tD)^{-1} R^T R D R^T R(I + 2tD)^{-1}(\alpha - t\beta) +$$
$$b^T R(I + 2tD)^{-1}(\alpha - t\beta) + c$$
$$= (\alpha - t\beta)^T (I + 2tD)^{-1} D (I + 2tD)^{-1}(\alpha - t\beta) +$$
$$\beta^T (I + 2tD)^{-1}(\alpha - t\beta) + c$$

where the inverse diagonal matrix is expanded as:

$$(I + 2tD)^{-1} = \begin{bmatrix} \frac{1}{1 + 2td_1} & 0 & 0 \\ 0 & \frac{1}{1 + 2td_2} & 0 \\ 0 & 0 & \frac{1}{1 + 2td_3} \end{bmatrix}$$

where $d_1$, $d_2$, and $d_3$ are the eigenvalues that made up the eigenvalue matrix D.

Multiplying through by $((1+2td_1)(1+2td_2)(1+2td_3))^2$ in the expanded equation above leads to a polynomial equation of the sixth degree. The roots can be calculated for the polynomial and $x = (I + 2tA)^{-1}(y - tb)$ can be calculated for each root. The distances between the calculated x and reported y positions then can be computed and the minimum distance can be found.

Alternative approaches for estimating the current position of an aircraft based on the TDOA of an ADS-B message transmitted by the aircraft that is received by two satellites also may be employed. A detailed description of an example of a less computationally intensive, alternative approach for estimating the current position of an aircraft based on the TDOA of an ADS-B message transmitted by the aircraft that is received by two satellites (e.g., satellite 1 and satellite 2)

follows. According to this approach, values for the following variables are initialized as follows:

$s_1$=distance between aircraft's self-reported position and satellite 1
$s_2$=distance between aircraft's self-reported position and satellite 2
$elev_1$=elevation angle between aircraft's self-reported position and satellite 1
$elev_2$=elevation angle between aircraft's self-reported position and satellite 2
$tomr_1$=time of reception of ADS-B message at satellite 1
$tomr_2$=time of reception of ADS-B message at satellite 2
$c$=speed of light Thereafter, the following calculations are performed to determine a distance, D, between the aircraft's self-reported position and an estimate of the aircraft's true position based on the TDOA of the ADS-B message at satellite 1 and satellite 2:

$$TDOA_{obs} = c(tomr_1 - tomr_2)$$

$$A = 4((s_1 \cos(elev_1) + s_2 \cos(elev_2))^2 - TDOA_{obs}^2)$$

$$B = 4((s_1^2 - s_1^2 - TDOA_{obs}^2)s_2 \cos(elev_2) + (s_2^2 - s_1^2 + TDOA_{obs}^2)s_1 \cos(elev_1))$$

$$C = (s_1^2 - s_2^2)^2 + TDOA_{obs}^4 - 2TDOA_{obs}^2(s_1^2 - s_2^2)$$

$$d_1 = |(-B + \sqrt{B^2 - 4AC})/2A|$$

$$d_2 = |(-B - \sqrt{B^2 - 4AC})/2A|$$

$D$=minimum of $d_1$ and $d_2$

In some implementations, a satellite-based ADS-B receiver may be configured to have multiple beams for receiving ADS-B messages, where, for example, one or more of the beams may be overlapping. For example, in some implementations, a satellite-based ADS-B receiver may include a phased-array antenna that provides multiple beams for receiving ADS-B messages. In such implementations where a satellite-based ADS-B receiver is configured to have multiple beams for receiving ADS-B messages, additional or alternative approaches to validating the self-reported position of an aircraft included in an ADS-B message may be performed.

Such so-called "beam-based validation" techniques may be particularly useful in a multi-satellite, space-based ADS-B system in situations in which there is little or no satellite coverage overlap for the location of an aircraft, which makes TDOA-based validation approaches difficult or impossible. For example, in a space-based ADS-B system comprised of a constellation of low-Earth orbit (LEO) satellites arranged in some number of planes of satellites in substantially polar orbits, there may be regions of little or no satellite coverage overlap near the equator.

In certain implementations where a satellite-based ADS-B receiver is configured to have multiple beams for receiving ADS-B messages, when an ADS-B message is received within one beam of the satellite-based receiver, the gain of each beam of the satellite-based receiver with respect to the position of the aircraft reported in the ADS-B message (or with respect to a defined coverage area that includes the position of the aircraft reported in the ADS-B message) may be determined (e.g., based on defined radiation patterns for the receiver and/or corresponding antenna elements) and used to identify the beams of the satellite-based receiver that are expected to receive the ADS-B message and the beams that are not expected to receive the ADS-B message. For example, the beams of the satellite-based receiver that have gains with respect to the position of the aircraft reported in the ADS-B message (or the corresponding defined coverage area) that exceed a defined threshold value may be identified as beams that are expected to receive the ADS-B message. Additionally or alternatively, the beams of the satellite-based receiver that have gains with respect to the position of the aircraft reported in the ADS-B message (or the corresponding defined coverage area) that are less than or equal to a defined threshold value may be identified as beams that are not expected to receive the ADS-B message.

In order to validate (or invalidate) the self-reported position information for the aircraft included in the ADS-B message, the beams of the satellite-based receiver that received the ADS-B message can be compared to the beams that were and/or were not expected to receive the ADS-B message. For example, in some implementations, a validation score may be calculated based on the individual beams of the satellite-based receiver that did or did not receive the ADS-B message relative to the beams of the satellite-based ADS-B receiver that were or were not expected to receive the ADS-B message. For example, the score may be based on one or more of (1) the number of beams of the satellite-based ADS-B receiver expected to receive the ADS-B message that did receive it, (2) the number of beams of the satellite-based ADS-B receiver expected to receive the ADS-B message that did not receive it, (3) the number of beams of the satellite-based ADS-B receiver not expected to receive the ADS-B message that did receive it, and (4) the number of beams of the satellite-based ADS-B receiver not expected to receive the ADS-B message that did receive it. If this validation score exceeds a defined threshold value, the position of the aircraft as reported in the ADS-B message may be determined to be valid.

Depending upon the implementation, the above-described TDOA-based and beam-based validation techniques may be used independently to validate (or invalidate) the position of an aircraft as reported in an ADS-B message and/or they may be used in a complimentary manner to validate (or invalidate) the position of an aircraft as reported in an ADS-B message. In some implementations, TDOA-based validation of the self-reported position of an aircraft may be performed when multiple satellite-based receivers have received the ADS-B message transmitted by the aircraft, and beam-based validation of the self-reported position of the aircraft may be performed when it is determined that only one (or less than some defined number of) satellite-based receivers have received the ADS-B messages transmitted by the aircraft.

For example, one approach for using the above-described TDOA-based and beam-based validation techniques in a complimentary manner is described with reference to FIGS. 4A-B. In this example approach, individual instances of TDOA-based validation results for the position of a particular aircraft during a first defined window of time may be assigned a first weight and individual instances of beam-based validation results for the position of the particular aircraft during a second defined window of time (that may be the same as or different from the first defined window of time) may be assigned a second weight. Then, an overall validation score for the current position of the particular aircraft may be calculated based on the assigned weights and the percentage of valid TDOA-based validation attempts during the first defined window of time and the percentage of valid beam-based validation attempts during the second defined window of time. For example, in one particular implementation, as illustrated in FIG. 4A, TDOA-based validation results for the position of the particular aircraft within a 600-second window of time (e.g., the 600 seconds immediately preceding the time of the self-reported position of the aircraft currently being processed) may be assigned a weight of 5 while beam-based validation attempts for the position of particular aircraft during a 2-second window of time (e.g., the 2 seconds immediately preceding the time of the self-reported position of the aircraft currently being processed) may be assigned a weight of 1. Thereafter, as illustrated in FIG. 4B, a total validation percentage score for the position of the aircraft may be calculated by taking the weighted sum of the valid TDOA-based validation attempts during the 600-second window of time and the valid beam-based validation attempts during the 2-second window of time and dividing by the weighted sum of the total number of TDOA-based validation attempts during the 600-second window of time and the total number of beam-based validation attempts during the 2-second window of time. If the total validation percentage score for the aircraft exceeds a defined threshold value, the current self-reported position of the aircraft may be determined to be valid.

Figure 5:
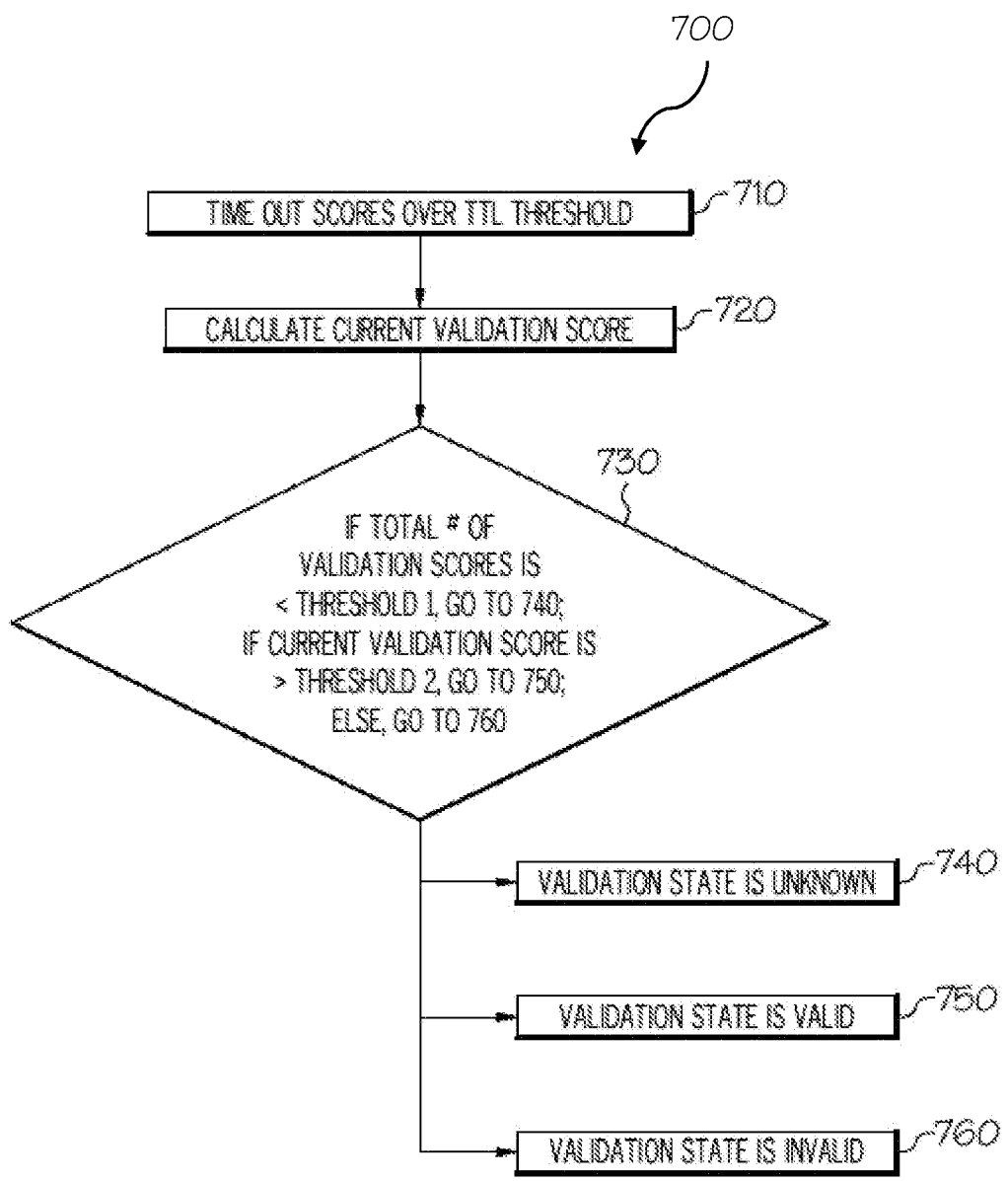
FIG. 5 is a flow chart illustrating an example of a method for validating self-reported position data in accordance with a non-limiting implementation of the present disclosure.

FIG. 5 is a flow chart 700 of one example of a method for determining a current validation state for the self-reported position of an aircraft included in an ADS-B message. At step 710, all validation scores for the self-reported position of the aircraft that have exceeded their defined time-to-live are discarded. A time-to-live may be defined such that only those prior validation scores for the self-reported position of the aircraft that are within some defined period of the current time are taken into account in determining the current validation state for the self-reported position of the aircraft. At step 720, the validation score for the current self-reported position of the aircraft is determined based on the remaining validation scores for the self-reported position of the aircraft. For example, in some implementations, the validation score can be calculated based on the equation depicted in FIG. 4B. In alternative implementations, the validation score may be calculated based, at least in part, on TDOA-based validation scores without beam-based validation scores. Likewise, in some other alternative implementations, the validation score may be calculated based, at least in part, on beam-based validation scores without TDOA-based validation scores. At step 730, if the total number of validation scores for the self-reported position of the aircraft currently under consideration is less than a first defined threshold, then the validation state for the self-reported position of the aircraft is set to unknown at step 740, for example, signifying that there may not be enough self-reported position data for the aircraft to determine if the current self-reported position of the aircraft is valid (e.g., because the aircraft just took off or no ADS-B messages have been received from the aircraft for an extended period of time). Alternatively, if the total number of validation scores for the self-reported position of the aircraft currently under consideration is greater than or equal to the first defined threshold and the validation score for the current self-reported position of the aircraft is greater than a second defined threshold, then the validation state for the self-reported position of the aircraft is set to valid at step 750. Otherwise, if the total number of validation scores for the self-reported position of the aircraft currently under consideration is greater than or equal to the first defined threshold but the validation score for the current self-reported position of the aircraft is less than or equal to the second defined threshold, then the validation state for the self-reported position of the aircraft is set to invalid at step 760.

Figure 6:
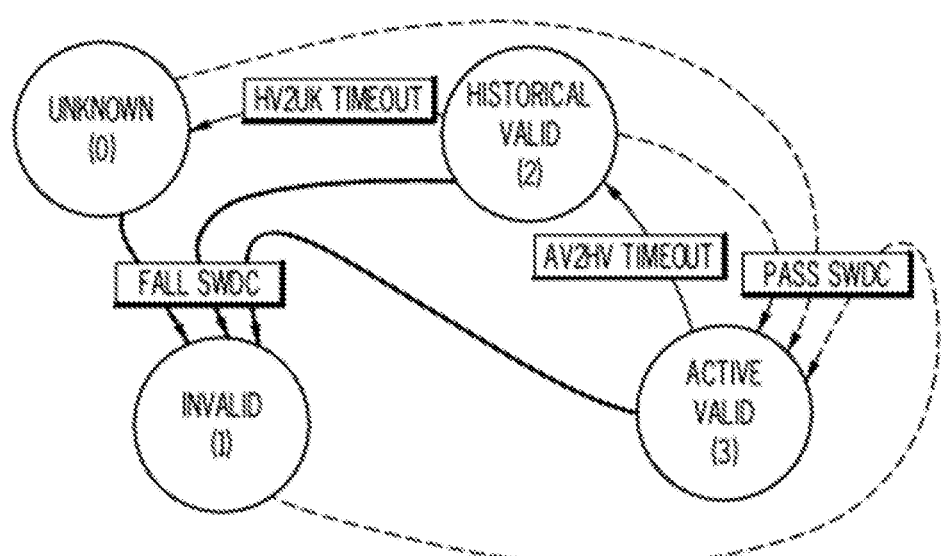
FIG. 6 is a block diagram of an example of a state machine for determining and updating the validity of self-reported position data in accordance with a non-limiting implementation of the present disclosure.

In some implementations, the validation state for the self-reported position of an aircraft may be determined and updated using a state machine. FIG. 6 is a block diagram of one example of a state machine for determining and updating the validation state for the self-reported position of an aircraft. As illustrated in FIG. 6, in some implementations, the validation state for the self-reported position of an aircraft may be in one of four different states:

Unknown—Signifying, for example, that the current self-reported position of the aircraft cannot or has not been validated. When the validation state for the self-reported position of an aircraft is first starting to be tracked, the validation state may start in the Unknown state until enough validation scores have been calculated to determine if the self-reported position of the aircraft is valid or invalid.

Invalid—Signifying that the self-reported position of the aircraft has been determined to be invalid, for example, because, as illustrated in the example of FIG. 6, the self-reported position of the aircraft failed a sliding window distance check (SWDC) because the percentage of times that the distance between the self-reported position of the aircraft and the estimated position of the aircraft exceeded a defined threshold distance during the sliding window in time exceeded a defined threshold percentage.

Active Valid—Signifying that the self-reported position of the aircraft has been determined to be valid, for example, because, as illustrated in the example of FIG. 6, the self-reported position of the aircraft passed the SWDC because the percentage of times that the distance between the self-reported position of the aircraft and the estimated position of the aircraft was less than a defined threshold distance during the sliding window in time exceeded a defined threshold percentage.

Historical Valid—Signifying, for example, that the validation state for the self-reported position of the aircraft was most recently determined to be valid but more than some defined period of time has elapsed since the most recent validation check was performed (e.g., because the aircraft is currently located in an area where there is little or no satellite coverage area overlap and TDOA-based validation checks cannot be performed). As illustrated in FIG. 6, if a defined period of time elapses while the validation state for the self-reported position of the aircraft remains Historical Valid, the validation state for the self-reported position of the aircraft may transition back to the Unknown state.

Figure 7:
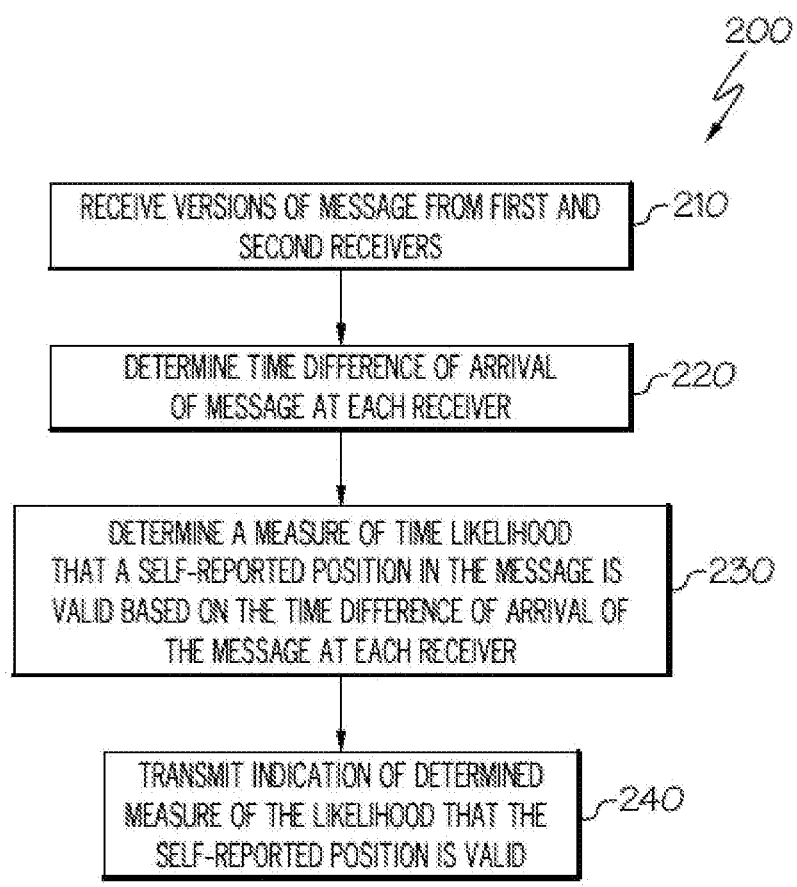
FIG. 7 is a flowchart illustrating an example of a method for validating self-reported position data in accordance with a non-limiting implementation of the present disclosure.

Referring now to FIG. 7, a flowchart 200 illustrating an example of a TDOA-based method for validating the self-reported position of an aircraft included in an ADS-B message received by two or more satellite-based receivers is shown in accordance with a non-limiting implementation of the present disclosure. At step 210, versions of (or data about) an ADS-B message received by both a first satellite-based receiver and a second satellite-based receiver are received. The ADS-B message includes a self-reported position of the aircraft that transmitted the ADS-B message. In some implementations, the versions of (or data about) the ADS-B message may be forwarded by the satellite-based receivers to a terrestrially based central processing system that receives them. Additionally or alternatively, the versions of (or data about) the ADS-B message may be received by a processing system that resides on one or more satellites, base stations, or other linked nodes in a satellite network or external to the network. In some implementations, the current distance between the two satellite-based receivers may be determined, and, if the distance is less than a defined threshold distance (e.g., 500 nautical miles), the self-reported position of the aircraft may not be validated based on the TDOA of the ADS-B message at the two satellite-based ADS-B receivers. At step 220, the TDOA of the message at each receiver is determined. In certain implementations, the message may include a transmit time. When the message is received, it may be stamped or otherwise marked with a receipt time. In such implementations, the differences in these times may be used to determine the TDOA of the message at the two receivers. In certain implementations, a hyperboloid may be generated that defines possible positions of the transmitter based on the TDOA of the message at the two receivers.

At step 230, a measure of the likelihood that the self-reported position of the aircraft included in the message is determined based on the TDOA of the message at the two receivers. In certain implementations, self-reported altitude data included in the message may be used to define an ellipsoid around the Earth at the self-reported altitude. In such implementations, the curve defined by the intersection of the hyperboloid and the ellipsoid may be considered to define possible estimated locations for the transmitter, and the distance between the self-reported position of the transmitter and the closest point on the curve to the self-reported position may be calculated. If that distance is less than a defined threshold distance, it may be determined that the self-reported position of the transmitter is likely to be valid. Alternatively, if that distance is greater than or equal to a defined threshold distance, it may be determined that the self-reported position of the transmitter is likely to be invalid. In alternative implementations, the distance between the self-reported position of the transmitter and the closest point on the hyperboloid to the self-reported position may be determined. If that distance is less than a defined threshold distance, it may be determined that the self-reported position of the transmitter is likely to be valid. Alternatively, if that distance is greater than or equal to a defined threshold distance, it may be determined that the self-reported position of the transmitter is likely to be invalid.

At step 240, the determined measure of the likelihood that the self-reported position is valid is transmitted. Additionally or alternatively, the determined measure of the likelihood that the self-reported position is valid also may be stored locally, for example, for later use. In some implementations, the determined measure of the likelihood that the self-reported position is valid may be transmitted to an air traffic control system, for example, for use by air traffic controllers. In some implementations, in addition to transmitting the determined measure of the likelihood that the self-reported position is valid, the self-reported position of the transmitter and/or the estimated position of the transmitter (e.g., the closest point on the curve defined by the intersection of the hyperboloid and the ellipsoid to the self-reported position of the transmitter or the closest point on the hyperboloid to the self-reported position of the transmitter) also may be transmitted. In implementations where the measure of the likelihood that the self-reported position is valid, the self-reported position of the transmitter, and the estimated position of the transmitter all are transmitted (e.g., to an air traffic control system), the self-reported position of the transmitter may be displayed concurrently with the measure of the likelihood that the self-reported position is valid and the estimated position of the transmitter.

As discussed above, in some cases, TDOA-based validation of an aircraft's self-reported position information in an ADS-B message may not be available (e.g., because the aircraft may be within the coverage area of only a single ADS-B receiver). In such cases, the validity of the aircraft's self-reported position may be evaluated by comparing the aircraft's self-reported position to a projected position of the aircraft (e.g., determined based on applying kinematic propagation techniques to prior position information for the aircraft). In some particular implementations, such aircraft position propagation techniques take into account a source position of the aircraft, a velocity of the aircraft, a propagation distance for the aircraft, and a heading or bearing of the aircraft to project a current position of the aircraft. The self-reported position of the aircraft then may be compared to the projected position for the aircraft and the distance between the self-reported position of the aircraft and the projected position for the aircraft compared against a threshold error distance to determine if the self-reported position of the aircraft is valid.

In some implementations, the source position of the aircraft used to project the aircraft's position in a propagation-based validation method may be a previously validated self-reported position of the aircraft, in which case the source position may have been validated according to one or more of the validation techniques described in the context of the present disclosure. For example, the source position may be the most recent self-reported position of the aircraft that was validated according to a TDOA-based, a beam-based, or a propagation-based validation technique described herein. In alternative implementations, the source position of the aircraft used to project the aircraft's position in a propagation-based validation method may be a previously projected position of the aircraft, in which case the source position may have been projected according to one or more of the techniques described in the context of the present disclosure.

FIG. 8 illustrates one example of a process for projecting a target aircraft's position (e.g., at the time of transmission of an ADS-B message by the target aircraft) based on previous position information for the target aircraft. In FIG. 8, the previous or source latitude position of the aircraft is designated as $\Phi_1$; the previous or source longitude position of the aircraft is designated as $L_1$; the previous or source heading (or azimuth) of the aircraft is designated as $\alpha_1$; and the previous or source speed of the aircraft is designated as V. The process illustrated in FIG. 8 outputs the propagated position of the target aircraft in the form of the propagated latitude position of the aircraft $\Phi_2$ and the propagated longitude position of the aircraft $L_2$. At line 1, a record corresponding to the target aircraft is retrieved (e.g., from an aircraft state vector table or other data structure stored in computer readable storage). In some implementations, an aircraft state vector table may include: time(s) of ADS-B message reception(s); reported aircraft position(s) (e.g., in latitude and longitude); reported aircraft speed(s); recorded and/or projected aircraft heading(s); propagated aircraft position(s) (e.g., in latitude and longitude); and/or aircraft position validation information including aircraft position validation distance(s). In certain implementations, only recent entries are maintained in an aircraft state vector table, and entries from before a particular threshold time period are discarded or moved out of the table to alternative storage. In other words, an aircraft state vector table can be purged of state vectors that are older than a configurable time limit.

At lines 2-8, the target aircraft's record is accessed. If the last self-reported position for the aircraft was validated using a TDOA-based technique, the source latitude position $\Phi_1$ is set to the aircraft's last self-reported latitude position and the source longitude position $L_1$ is set to the aircraft's last self-reported longitude position. If the last self-reported position for the aircraft was not validated using a TDOA-based technique, the source latitude position $\Phi_1$ is set to the aircraft's last propagated latitude position and the source longitude position $L_1$ is set to the aircraft's last propagated longitude position. At lines 9-11, the aircraft's last reported heading $\alpha_1$ and speed V are retrieved along with a time of receipt $T_1$ of the last ADS-B message for the aircraft. In some implementations, if the last ADS-B message for the aircraft was received by multiple satellite-based ADS-B receivers, $T_1$ may be selected as the earliest time at which the ADS-B message was received by one of the satellite-based ADS-B receivers. At line 13, a propagation distance, s, for the aircraft is calculated by multiplying the aircraft's last reported speed V by the elapsed time between the time $T_1$ at which the last ADS-B message for the aircraft was received and the time $T_2$ at which the current ADS-B message was received. At lines 14-15, the aircraft's source latitude position $\Phi_1$, the aircraft's source longitude position $L_1$, the aircraft's last reported heading $\alpha_1$, and the propagation distance s for the aircraft are input into a process that applies an implementation of Vincenty's Formula to derive a new, propagated position for the aircraft expressed as $\Phi_2$ and $L_2$, where $\Phi_2$ is the propagated latitude position of the aircraft and $L_2$ is the propagated longitude position of the aircraft.

FIG. 9 illustrates one example of a process that applies Vincenty's Formula to propagate a new position for a target aircraft based on the aircraft's source latitude position $\Phi_1$, the aircraft's source longitude position $L_1$, the aircraft's last reported heading $\alpha_1$, and the propagation distance s for the aircraft. In some implementations, the following standard WGS-84 ellipsoid values may be used in the process illustrated in FIG. 9:

$a$=semi-major access of the ellipsoid=6378137.0 meters $f$=flattening of the ellipsoid=1/298.257223563

$b$=semi-minor access of the ellipsoid=(1-$f$)

In addition, a value may be set for the constant ε. For example, in some implementations, c may be set to equal to $1\times10^{-12}$. As illustrated in FIG. 9, the process returns the propagated latitude position of the aircraft $\Phi_2$, the propagated longitude position of the aircraft $L_2$, and a projected new heading (or azimuth) for the aircraft $\alpha_2$. In some implementations, the projected new heading for the aircraft $\alpha_2$ may not be returned and/or the projected new heading for the aircraft $\alpha_2$ may be discarded. To validate (or invalidate) the position of the aircraft as reported in the ADS-B message, the propagated position of the aircraft may be compared to the position of the aircraft reported in the ADS-B message. If the distance between the propagated position of the aircraft and the position of the aircraft reported in the ADS-B message is within a defined range, the position of the aircraft reported in the ADS-B message may be considered to be valid, while the position of the aircraft reported in the ADS-B message may be considered to be invalid if the distance between the propagated position of the aircraft and the position of the aircraft reported in the ADS-B message exceeds the defined range.

Depending upon the implementation, the above-described TDOA-based, beam-based, and/or propagation-based validation techniques may be used independently to validate (or invalidate) the position of an aircraft as reported in an ADS-B message and/or they may be used in a complimentary manner to validate (or invalidate) the position of an aircraft as reported in an ADS-B message.

Figure 10:
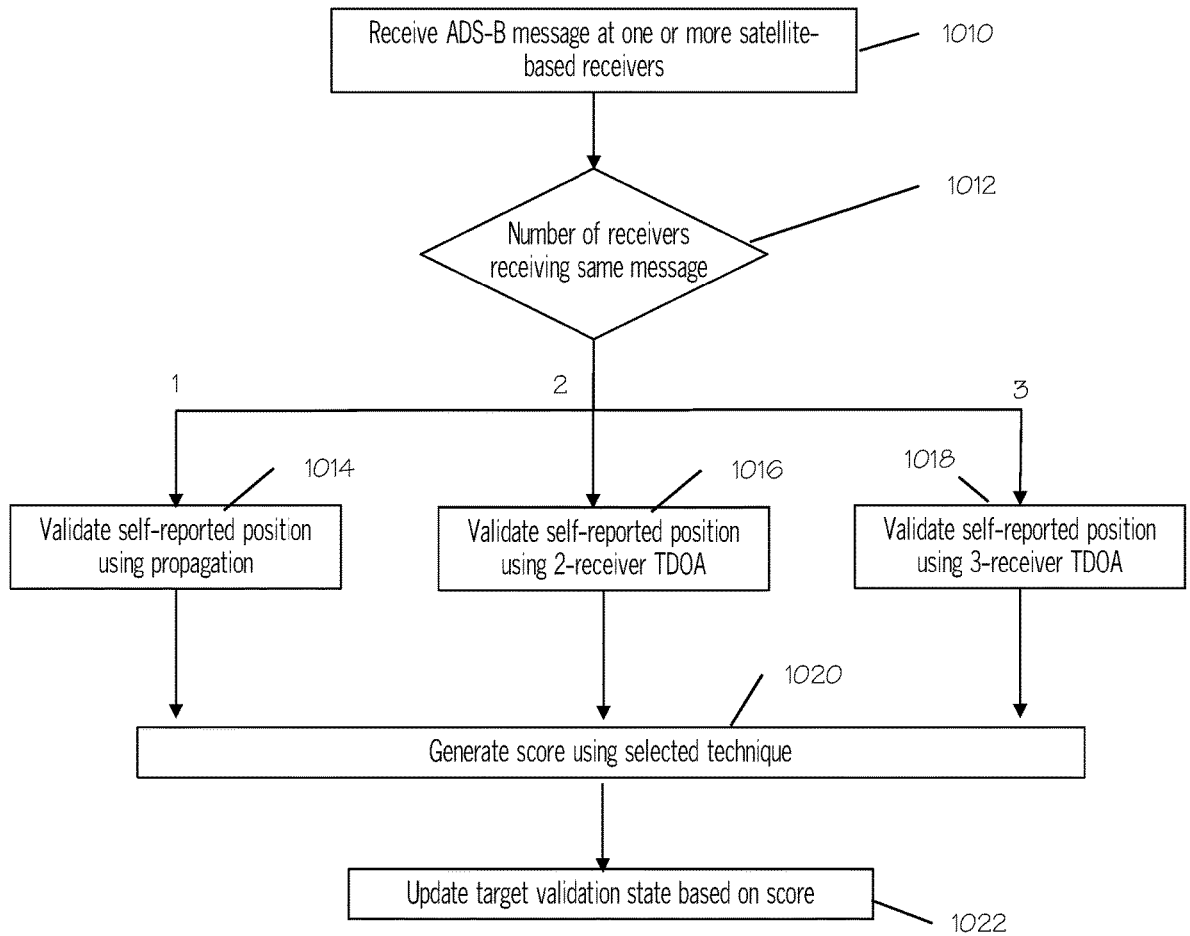
FIG. 10 is a flowchart illustrating an example of a method for validating self-reported position data in accordance with a non-limiting implementation of the present disclosure.

FIG. 10 is a flow chart illustrating one example of a method for updating a validation state for the self-reported position of an aircraft. As illustrated in FIG. 10, at step 1010, one or more instances of an ADS-B message broadcast by an aircraft are received at one or more corresponding satellite-based receivers. At step 1012, a particular validation technique is selected to validate the self-reported position of the aircraft included in the ADS-B message based on the number of satellite-based receivers that received the ADS-B message. If the ADS-B message was received by only a single ADS-B receiver, the self-reported position of the aircraft may be validated using propagation-based validation techniques described herein at step 1014. If the ADS-B message was received by two ADS-B receivers, the self-reported position of the aircraft may be validated using 2-receiver TDOA-based validation techniques described herein at step 1016. Otherwise, if the ADS-B message was received by three ADS-B receivers, the self-reported position of the aircraft may be validated using 3-receiver TDOA-based validation techniques described herein at step 1018. Thereafter, at step 1020, a validation score for the aircraft's self-reported position is generated based on the outcome of having applied the selected validation technique, and the aircraft's validation state is updated based on the score at step 1022.

In some implementations, a historical scoring method is used to validate the self-reported position information for an aircraft included in ADS-B messages broadcast by the aircraft. In some particular implementations of such a historical scoring method, a record is maintained for the aircraft, and the validation state for the self-reported position of the aircraft is set to a state of Valid A (e.g., within a defined range of precision), Valid B (e.g., within a different defined range of precision that is not as precise as Valid A), Invalid, or Unknown based on previously assigned "Valid A," Valid B," and "Invalid" scores recorded in the aircraft's record corresponding to prior self-reported positions of the aircraft and one or more "Valid A," "Valid B," or "Invalid" scores added to the aircraft's record based on the aircraft's self-reported position included in the current ADS-B message received from the aircraft, for example as described in greater detail below and as illustrated in FIGS. 11 and 12. In some implementations, the "Valid A" scores, "Valid B" scores, and "Invalid" scores recorded in the aircraft's record may be used to set the corresponding validation state for the self-reported position of the aircraft, for example as described in greater detail below and as illustrated in FIGS. 11 and 12.

FIGS. 11 and 12 collectively illustrate one example of such a historical scoring method for validating the self-reported position information for an aircraft included in ADS-B messages broadcast by the aircraft. The method illustrated in FIGS. 11 and 12 may be performed when a new ADS-B message broadcast by the aircraft is received. The following configurable constants may be defined for the portion of the method illustrated in FIG. 11:

| | |
|---|---|
| $r_A$ = | The maximum distance between the self-reported position of the aircraft and the computed position of the aircraft for the self-reported position of the aircraft to be considered within the defined range of precision corresponding to the Valid A validation state. (In some implementations, $r_A$ may be set to 1.9 nautical miles.) |
| $r_B$ (where $r_B > r_A$) = | The maximum distance between the self-reported position of the aircraft and the computed position of the aircraft for the self-reported position of the aircraft to be considered within the defined range of precision corresponding to the Valid B validation state. (In some implementations, $r_B$ may be set to 5.0 nautical miles.) |
| MaxRange = | The maximum allowable slant range between the aircraft and the receiving satellite. ADS-B messages received from aircraft outside of this range may be considered to be "spoofs." |
| CoastMin = | The minimum period of time that must pass following the most recent successful TDOA-based validation before a propagation-based validation may be performed. |
| CoastMax = | The maximum period of time following the most recent successful TDOA-based validation during which propagation-based validation may be performed. |

In addition, values may be assigned to the following scores for the portion of the method illustrated in FIG. 11:

| | |
|---|---|
| Bad Range Score = | Value added to the "Invalid" score when the slant range between the aircraft and the receiving satellite exceeds MaxRange. (E.g., 100) |
| Good TDOA Score = | Value added to either the "Valid A" or "Valid B" score when the TDOA-based validation distance is less than or equal to $r_A$ or $r_B$, respectively. (E.g., 10) |
| Bad TDOA Score = | Value added to the "Invalid" score when the TDOA-based validation distance is greater than $r_B$. (E.g., 50) |
| Good Track Score = | Value added to either the "Valid A" or "Valid B" score when the propagation-based validation distance is less than or equal to $r_A$ or $r_B$, respectively. (E.g., 1) |
| Bad Track Score = | Value added to the "Invalid" score when the propagation-based validation distance is greater than $r_B$. (E.g., 1) |

At line 1 of FIG. 11, one or more instances of an ADS-B message broadcast by a target aircraft are received by one or more corresponding satellite-based receivers. At lines 2-7 of FIG. 11, the slant range between the aircraft and each satellite-based receiver that received the ADS-B message is calculated (e.g., using the self-reported position of the aircraft) and compared to the defined MaxRange value. For each satellite-based receiver that received the ADS-B message for which the slant range between the aircraft and the satellite-based receiver exceeds the defined MaxRange value, the defined Bad Range Score is added to the "Invalid" score for the aircraft.

Next, at lines 8-17 of FIG. 11, if the ADS-B message was received by more than one satellite-based receiver, the TDOA-based validation distance for the aircraft's self-reported position included in the ADS-B message (e.g., calculated according to techniques described herein) is compared to $r_A$ and, in some cases, $r_B$. If the TDOA-based validation distance is less than or equal to $r_A$, the Good TDOA score is added to the "Valid A" score. If the TDOA-based validation distance is greater than $r_A$ but less than or equal to $r_B$, the Good TDOA score is added to the "Valid B" score. If the TDOA-based validation distance is greater than both $r_A$ and $r_B$, the "Bad TDOA" score is added to the "Invalid" score.

At line 18 of FIG. 11, the value of $T_{TDOA}$ is set to a time of reception of the most recent ADS-B message for which the self-reported position of the aircraft included in the ADS-B message was validated successfully using a TDOA-based validation approach. For example, in some implementations, the value of $T_{TDOA}$ may be set to the first time at which such ADS-B message was received by a satellite-based ADS-B receiver within the system. In addition, at line 19, the value of $T_{msg}$ is set to a time of reception of the most recently received ADS-B message. For example, in some implementations, the value of $T_{msg}$ may be set to the first time at which the most recently received ADS-B message was received by a satellite-based ADS-B receiver within the system.

As further illustrated in FIG. 11, if the ADS-B message was received by only one satellite-based receiver, at lines 20-30, the "Valid A" score, the "Valid B" score, or the "Invalid" score may be updated based on the propagation-based validation distance for the aircraft's self-reported position included in the ADS-B message. More particularly, if the time between $T_{msg}$ and $T_{TDOA}$ is more than the defined CoastMin and less than the defined CoastMax, the propagation-based validation distance (e.g., calculated according to techniques described herein) is compared to $r_A$ and, in some cases, $r_B$. If the propagation-based validation distance is less than or equal to $r_A$ and the TDOA-based validation distance for the most recent ADS-B message that was validated successfully using a TDOA-based approach was less than or equal to $r_A$, the Good Track score is added to the "Valid A" score. If (i) the propagation-based validation distance is less than or equal to $r_A$ but the TDOA-based validation distance for the most recent ADS-B message that was validated successfully using a TDOA-based approach was greater than $r_A$, or (ii) the propagation-based validation distance is greater than $r_A$ but less than or equal to $r_B$, the Good Track score is added to the "Valid B" score. If the propagation-based validation distance is greater than both $r_A$ and $r_B$, the "Bad Track" score is added to the "Invalid" score.

Thereafter, at line 31 of FIG. 11, the record for the aircraft is updated to reflect the changes made to the values for the "Valid A," "Valid B," and "Invalid" scores. For example, the newly assigned "Valid A," "Valid B," and/or "Invalid" scores corresponding to the aircraft's most recent self-reported position may be added to the aircraft's record. In some cases, this may involve adding a value of zero (or the like) to the aircraft's record for one or more of the "Valid A," "Valid B," and/or "Invalid" scores if no other such value is assigned during the process illustrated in FIG. 11.

In the portion of the method illustrated in FIG. 12, the updated values for the "Valid A," Valid B," and "Invalid" scores are used to determine a current validation state for the aircraft's self-reported position information included in ADS-B messages. As described above, possible validation states include "Valid A," "Valid B," "Invalid," and "Unknown."

The following configurable constants may be defined for the portion of the method illustrated in FIG. 12:

| | |
|---|---|
| Minimum Score = | The minimum total score required to avoid a validation state of "Unknown." (E.g., 50) |
| Invalid Threshold = | The minimum value of the ratio between the "Invalid" score and the total score to trigger the "Invalid" state. |
| Valid A Threshold = | The minimum value of the ratio between the "Valid A" score and the total valid score to trigger the "Valid A" state. |

As illustrated in FIG. 12, at line 1, all of the scores in the aircraft's record that are older than a defined time-to-live are discarded. Thereafter, at lines 2-4, sums of the "Invalid," "Valid A," and "Valid B" scores are calculated for the remaining scores in the aircraft's record. In addition, at line 5, the total valid score is calculated by taking the sum of the "Valid A" and "Valid B" scores in the aircraft's record, and, at line 6, the total score is calculated by taking the sum of the total valid and "Invalid" scores in the aircraft's record.

At lines 7-18, a validation state then is assigned for the aircraft's self-reported position information included in ADS-B messages. In particular, if the total score is less than the defined Minimum Score, the validation state for the aircraft's self-reported position information is assigned the "Unknown" state. Otherwise, if the ratio of the "Invalid" score to the total score is greater than the defined Invalid Threshold, the validation state for the aircraft's self-reported position information is assigned the "Invalid" state. Alternatively, if the ratio of the "Invalid" score to the total score is less than or equal to the defined Invalid Threshold and the ratio of the "Valid A" score to the total valid score is greater than the defined Valid A threshold, the validation state for the aircraft's self-reported position information is assigned the "Valid A" state. In contrast, if the ratio of the "Invalid" score to the total score is less than or equal to the defined Invalid Threshold but the ratio of the "Valid A" score to the total valid score is less than or equal to the defined Valid A threshold, the validation state for the aircraft's self-reported position information is assigned the "Valid B" state.

Aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more machine-readable media having machine-readable program code embodied thereon.

Any combination of one or more machine-readable media may be utilized. The machine-readable media may be a machine-readable signal medium or a machine-readable storage medium. A machine-readable storage medium may be, for example, but not limited to, an electronic, magnetic, optical, electromagnetic, or semiconductor system, apparatus, or device, or any suitable combination of the foregoing. More specific examples (a non-exhaustive list) of such a machine-readable storage medium include the following: a hard disk, a random access memory (RAM), a read-only memory (ROM), an erasable programmable read-only memory (EPROM or Flash memory), an appropriate optical fiber with a repeater, an optical storage device, a magnetic storage device, or any suitable combination of the foregoing. In the context of this document, a machine-readable storage medium may be any tangible medium that can contain or store a program for use by or in connection with an instruction execution system, apparatus, or device, such as, for example, a microprocessor.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device. Program code embodied on a machine-readable signal medium may be transmitted using any appropriate medium, including but not limited to wireless, wireline, optical fiber cable, RF signals, etc., or any suitable combination of the foregoing.

Computer program code for carrying out operations for aspects of the present disclosure may be written in any combination of one or more programming languages, including object oriented programming languages, dynamic programming languages, and/or procedural programming languages.

The flowcharts and block diagrams in the figures illustrate examples of the architecture, functionality, and operation of possible implementations of systems, methods and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and machine-readable instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Furthermore, while the position validation techniques described herein generally were disclosed in the context of validating self-reported position information included in ADS-B messages received by space-based ADS-B receivers, the position validation techniques also may be applicable to and may be used by terrestrial ADS-B receivers to validate self-reported position information. Moreover, the position validation techniques described herein are not limited to validating self-reported position information included in ADS-B messages and may be used to validate position information in other contexts as well. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A method comprising:
receiving a number of instances of a message from a corresponding number of satellite-based receivers that each received a radio frequency ("RF") transmission of an instance of the message, the message comprising a self-reported position of a transmitter of the message;
determining the number of satellite-based receivers that received an instance of the message;
selecting a validation technique, from a plurality of validation techniques, for validating the self-reported position of the transmitter of the message based on the number of satellite-based receivers that received an instance of the message;
determining a measure of the likelihood that the self-reported position of the transmitter is valid using the selected validation technique; and
transmitting an indication of the measure of the likelihood that the self-reported position is valid.

2. The method of claim 1, wherein selecting a validation technique for validating the self-reported position of the transmitter of the message based on the number of satellite-based receivers that received an instance of the message includes selecting, if the number of satellite-based receivers that received an instance of the message is two or more, a TDOA-based validation technique that estimates the current position of the transmitter based on times at which the satellite-based receivers that received an instance of the message received the RF transmissions of the instances of the message.

3. The method of claim 1, wherein determining the measure of the likelihood that the self-reported position of the transmitter is valid using the selected validation technique includes determining the measure of the likelihood that the self-reported position of the transmitter is valid based on a second measure of the likelihood that a previous self-reported position of the transmitter is valid.

4. The method of claim 3, wherein determining the measure of the likelihood that the self-reported position of the transmitter is valid using the selected validation technique includes determining the measure of the likelihood that the self-reported position of the transmitter is valid based on a length of time since the previous self-reported position of the transmitter.

5. The method of claim 1, wherein the transmitter is hosted on an in-flight aircraft.

6. The method of claim 1, wherein the message is an automatic dependent surveillance-broadcast ("ADS-B") message transmitted by a transmitter on the aircraft.

7. The method of claim 1, wherein:
determining that a total number of satellite-based receivers that received an instance of the message is one, and
the validation technique estimates the current position of the transmitter based on prior position information for the transmitter.

8. The method of claim 7, wherein selecting a validation technique for validating the self-reported position of the transmitter of the message based on the number of satellite-based receivers that received an instance of the message includes:
determining that the number of satellite-based receivers that received an instance of the message is one, and
selecting the validation technique as a consequence of having determined that the number of satellite-based receivers that received an instance of the message is one; and
determining a measure of the likelihood that the self-reported position of the transmitter is valid using the selected validation technique includes determining a measure of the likelihood that the self-reported position of the transmitter is valid using the validation technique based on a previous position of the transmitter at a previous time, a previous speed of the transmitter at the previous time, a previous bearing of the transmitter at the previous time, and a time at which the transmitter transmitted the RF transmission of the message.

9. A method comprising:
receiving an instance of a current message from a satellite-based receiver that received a radio frequency ("RF") transmission of the current message, the current message comprising a self-reported position of a transmitter of the message;
estimating, based on a previous message transmitted by the transmitter at a previous time, a current position of the transmitter based on a previous position of the transmitter at the previous time, a previous speed of the transmitter at the previous time, a previous bearing of the transmitter at the previous time, and a current time at which the transmitter transmitted the RF transmission of the current message;
determining a measure of the likelihood that the self-reported position of the transmitter is valid based on a distance between the estimated current position of the transmitter and the self-reported position of the transmitter; and
transmitting an indication of the measure of the likelihood that the self-reported position is valid.

10. The method of claim 9, wherein estimating the current position of the transmitter includes estimating a distance travelled by the transmitter between the current time and the previous time based on the previous speed of the transmitter at the previous time and the time between the current time and the previous time.

11. The method of claim 10, wherein estimating the current position of the transmitter based on the previous position of the transmitter at the previous time, the previous speed of the transmitter at the previous time, the previous bearing of the transmitter at the previous time, and the current time at which the transmitter transmitted the RF transmission of the current message includes estimating the current position of the transmitter based on the estimated distance travelled by the transmitter between the current time and the previous time.

12. The method of claim 11, wherein estimating the current position of the transmitter includes using Vincenty's formula to estimate the current position of the transmitter based on the previous position of the transmitter at the previous time, the previous bearing of the transmitter at the previous time, and the estimated distance travelled by the transmitter between the current time and the previous time.

13. The method of claim 9, wherein the transmitter is hosted on an in-flight aircraft.

14. The method of claim 9, wherein the message is an automatic dependent surveillance-broadcast ("ADS-B") message transmitted by the transmitter on the aircraft.

15. A system comprising:
one or more processors; and
a memory coupled to the processors comprising instructions executable by the processors, the processors being operable when executing the instructions to:
receive a number of instances of a message from a corresponding number of satellite-based receivers that each received a radio frequency ("RF") transmission of an instance of the message, the message comprising a self-reported position of a transmitter of the message;
determine the number of satellite-based receivers that received an instance of the message;
select a validation technique, from a plurality of validation techniques, for validating the self-reported position of the transmitter of the message based on the number of satellite-based receivers that received an instance of the message;
determine a measure of the likelihood that the self-reported position of the transmitter is valid using the selected validation technique; and
transmit an indication of the measure of the likelihood that the self-reported position is valid.

16. The system of claim 15, wherein the processors are further operable when executing the instructions to:
update a validation state for the transmitter based on the determined measure of the likelihood that the self-reported position of the transmitter is valid; and
transmit an indication of the measure of the likelihood that the self-reported position is valid based on the updated validation state for the transmitter.

17. The system of claim 15, wherein the processors are further operable when executing the instructions to select a TDOA-based validation technique that estimates the current position of the transmitter based on times at which the satellite-based receivers that received an instance of the message received the RF transmissions of the instances of the message if the number of satellite-based receivers that received an instance of the message is two or more.

18. The system of claim 15, wherein the processors are further operable when executing the instructions to determine the measure of the likelihood that the self-reported position of the transmitter is valid based on a second measure of the likelihood that a previous self-reported position of the transmitter is valid.

19. The system of claim 18, wherein the processors are further operable when executing the instructions to determine the measure of the likelihood that the self-reported position of the transmitter is valid based on a length of time since the previous self-reported position of the transmitter.

20. The system of claim 15, wherein the processors are further operable when executing the instructions to:
select the validation technique as a consequence of having determined that the number of satellite-based receivers that received an instance of the message is one;
determine a measure of the likelihood that the self-reported position of the transmitter is valid using the validation technique based on a previous position of the transmitter at a previous time, a previous speed of the transmitter at the previous time, a previous bearing of the transmitter at the previous time, and a time at which the transmitter transmitted the RF transmission of the message.

21. The system of claim 15, wherein the message is an automatic dependent surveillance-broadcast ("ADS-B") message transmitted by a transmitter on the aircraft.

\* \* \* \* \*